United States Patent
Bergström

(10) Patent No.: US 10,144,426 B2
(45) Date of Patent: Dec. 4, 2018

(54) METHOD FOR CONTROLLING FREE-WHEELING IN A DUAL CLUTCH TRANSMISSION IN A VEHICLE

(71) Applicant: VOLVO TRUCK CORPORATION, Göteborg (SE)

(72) Inventor: Klas Bergström, Västra Frölunda (SE)

(73) Assignee: Volvo Truck Corporation, Göteborg (SE)

( * ) Notice: Subject to any disclaimer, the term of this patent is extended or adjusted under 35 U.S.C. 154(b) by 77 days.

(21) Appl. No.: 15/314,049

(22) PCT Filed: Jun. 16, 2014

(86) PCT No.: PCT/EP2014/001628
§ 371 (c)(1),
(2) Date: Nov. 25, 2016

(87) PCT Pub. No.: WO2015/192860
PCT Pub. Date: Dec. 23, 2015

(65) Prior Publication Data
US 2017/0144668 A1   May 25, 2017

(51) Int. Cl.
*B60W 30/18*   (2012.01)
*B60W 10/02*   (2006.01)
(Continued)

(52) U.S. Cl.
CPC ...... *B60W 30/18072* (2013.01); *B60W 10/02* (2013.01); *B60W 10/113* (2013.01);
(Continued)

(58) Field of Classification Search
CPC ............... B60W 10/02; B60W 10/113; B60W 30/18072; B60W 2030/1809;
(Continued)

(56) References Cited

U.S. PATENT DOCUMENTS 8,632,438 B2 * 1/2014 Kuroda ............... B60K 6/48
477/5
9,702,460 B2 * 7/2017 Hedman ............ F16H 61/702
(Continued)

FOREIGN PATENT DOCUMENTS

CN      102235491 A    11/2011
CN      103104697 A     5/2013
(Continued)

OTHER PUBLICATIONS

International Search Report (dated Mar. 19, 2015) for corresponding International App. PCT/EP2014/001628.
(Continued)

*Primary Examiner* — Ramya P Burgess
*Assistant Examiner* — David R Morris
(74) *Attorney, Agent, or Firm* — WRB-IP LLP

(57) ABSTRACT

When the control unit monitoring the dual clutch transmission detects input signals from the driver and/or the prime mover and transmission indicating that the free-wheeling mode should be exited, then the transmission is controlled to reconnect the prime mover and the driving wheels. According to the invention, a rapid reconnection of the prime mover to the driven wheels is achieved by engaging the second, normally open clutch unit. Prior to engagement, the control unit can select a suitable gear depending on the input signals from the driver and/or the prime mover. As none of the first set of gears connecting the first input shaft to the driving wheels in the first transmission mechanism is engaged, the first clutch unit can be disengaged during or after engagement of the second clutch unit.

13 Claims, 4 Drawing Sheets

(51) Int. Cl.
*B60W 10/113* (2012.01)
*F16D 21/06* (2006.01)
*F16H 61/68* (2006.01)
*F16H 57/04* (2010.01)
*F16H 61/688* (2006.01)
*F16H 3/00* (2006.01)
*F16H 3/089* (2006.01)
*F16H 61/70* (2006.01)
*F16H 63/30* (2006.01)
*F16H 59/18* (2006.01)

(52) U.S. Cl.
CPC .............. *F16D 21/06* (2013.01); *F16H 3/006* (2013.01); *F16H 3/089* (2013.01); *F16H 57/0434* (2013.01); *F16H 61/688* (2013.01); *F16H 61/702* (2013.01); *B60W 2030/1809* (2013.01); *B60W 2710/021* (2013.01); *B60W 2710/1005* (2013.01); *B60W 2710/30* (2013.01); *B60Y 2300/18083* (2013.01); *F16H 2059/186* (2013.01); *F16H 2063/3036* (2013.01); *Y02T 10/76* (2013.01)

(58) Field of Classification Search
CPC ..... B60W 2710/021; B60W 2710/1005; F16H 3/006; F16H 3/089; F16H 57/0434
See application file for complete search history.

(56) References Cited

U.S. PATENT DOCUMENTS

| | | | |
|---|---|---|---|
| 9,862,377 | B2* | 1/2018 | Cheong ................ B60W 20/30 |
| 2011/0218716 | A1 | 9/2011 | Olsson |
| 2012/0322603 | A1 | 12/2012 | Kuroda |
| 2016/0116062 | A1* | 4/2016 | Hedman ............. F16H 57/0441 701/51 |
| 2016/0229407 | A1* | 8/2016 | Karpenman ......... B60W 10/113 |
| 2016/0297445 | A1* | 10/2016 | Bjernetun ....... B60W 30/18072 |

FOREIGN PATENT DOCUMENTS

| | | |
|---|---|---|
| EP | 2269882 A2 | 1/2011 |
| JP | 2001200899 A | 7/2001 |
| WO | 2010109573 A1 | 9/2010 |
| WO | 2011125915 A1 | 10/2011 |

OTHER PUBLICATIONS

International Preliminary Report on Patentability (dated Jul. 1, 2016) for corresponding International App. PCT/EP2014/001628.
Chinese Official Action (dated Feb. 20, 2018) for corresponding Chinese App. 201480079899.9.
Japanese Official Action (dated Apr. 3, 2018) for corresponding Japanese App. JP 2016-573510.

* cited by examiner

METHOD FOR CONTROLLING FREE-WHEELING IN A DUAL CLUTCH TRANSMISSION IN A VEHICLE

BACKGROUND AND SUMMARY

The invention relates to a method for controlling free-wheeling in a dual clutch transmission in a vehicle for achieving minimum energy losses and sufficient lubrication of the transmission during free-wheeling.

The invention can be, applied in heavy-duty vehicles, such as trucks, buses and construction equipment. Although the invention will be described with respect to a truck, the invention is not restricted to this particular vehicle.

A dual clutch transmission is a transmission with two input shafts where each input shaft has its own clutch and where one of the input shafts is used by one set of gears, for instance odd gears, and the other input shaft is used by a second set of gears, for instance even gears. The clutches connect the input shafts to the provider of mechanical energy in the vehicle, which can be a prime mover such as an internal combustion engine or an electric motor.

Free-wheeling is defined as a state when the vehicle is allowed to roll without driving or braking torque on the wheels. This requires disconnecting the engine from the driving wheels of the vehicle. One problem relating to this operation can include energy losses caused by clutch actuation to achieve said disconnection, where the clutch must be maintained in its actuated position while the vehicle is in free-wheeling mode.

A further problem relates to insufficient lubrication of the transmission caused by deactivation of a clutch connected to a drive shall for driving an oil pump. When a clutch is actuated to initiate free-wheeling mode, this action can simultaneously stop the transmission lubrication pump. Known solutions can involve the provision of an electric motor for driving the lubrication pump during periods of torque interruption.

When the free-wheeling mode is terminated there may also be problems relating to delays in re-connection of the engine to the driving wheels. During a period of torque interruption one or more shafts in the transmission may stop rotating, wherein said shafts must be brought up to speed before re-connection or a gear change can be performed.

It is desirable to provide an improved method and arrangement for controlling a dual clutch transmission during free-wheeling that solves or minimizes the above problems.

It is desirable to provide a method and a device for controlling free-wheeling in a dual clutch transmission in a vehicle, which method and device aims at achieving minimum energy losses and sufficient lubrication of the transmission during free-wheeling.

The provision of a method and a device for controlling free-wheeling in a dual clutch transmission according to an aspect of the invention will give a number of advantages such as low energy losses, as no clutch actuation forces are required during free-wheeling mode. Sufficient lubrication of the transmission during free-wheeling mode is ensured as the lubrication pump is driven via a clutch connected to the output shaft of a prime mover. A further advantage is that fast and safe engagement of the prime mover to the driven wheels after termination of free-wheeling mode is achieved without having to bring the transmission up to speed or to actuate and engage a gear set, as the on-coming gear has already been preselected.

A first embodiment relates to a method for controlling free-wheeling in a dual clutch transmission in a vehicle. The transmission comprises a first transmission mechanism arranged to transmit mechanical driving force from an output shaft of a prime mover, such as an internal combustion engine, to a first input shaft and to put each of a first set of gears in an engaged state to connect the first input shaft to the driving wheels. The transmission further comprises a second transmission mechanism arranged to transmit mechanical driving force from the output shaft of the prime mover to a second input shaft and to put any one of a second set of gears in an engaged state to connect the second input shaft to the driving wheels.

In this context, the term transmission mechanism is defined as comprising the component parts required for transmitting torque between the prime mover and the driven wheels via the first or the second input shaft, including the respective clutches associated with the first and second input shafts, respectively.

The first transmission mechanism comprises a controllable first clutch unit arranged to bring the output shaft of the prime mover and the first input shaft into engagement with each other. Similarly, the second transmission mechanism comprises a controllable second clutch unit arranged to bring the output shaft of the prime mover and the second input shaft into engagement with each other. An electronic control unit is arranged to control gear selection and clutch unit actuation. The control unit is arranged to monitor the dual clutch transmission and to control the transmission in response to input signals from the driver and detected prime mover and transmission parameters.

The invention involves performing the following method steps upon determining that a freewheeling mode is to be initiated:
 deactivating the first clutch unit, wherein the output shaft of the prime mover and the first input shaft are engaged;
 disengaging each of the first set of gears connecting the first input shaft to the driving wheels.
 deactivating the second clutch unit, wherein the output shaft of the prime mover and the second input shaft are disengaged; and
 engaging one of the second set of gears connecting the second input shaft to the driving wheels.

In this example, the first clutch unit is normally closed which means that the clutch is held in a closed, engaged position by a resilient means, a spring or a similar suitable means. To disengage the first clutch it is actuated by fluid pressure or other suitable means. A non-exhaustive list of actuating means includes hydraulic or pneumatic pressure, as well as electromagnetic or electromechanical means. The second clutch unit is normally open which means that the clutch is held in an open, disengaged position by a resilient means, a spring or a similar suitable means. To engage the second clutch it is actuated by hydraulic pressure or other suitable means.

According to the method, a transmission lubricating device is connected to and driven by the first transmission mechanism during a free-wheeling mode. This ensures sufficient lubrication of the transmission during free-wheeling, when no torque is transmitted between the prime mover and the driving wheels.

A method and an arrangement for controlling free-wheeling in a dual clutch transmission in a vehicle, which transmission includes a first and a second transmission mechanism controllable by a first and a second clutch unit, each connected to a first and a second input shaft respectively, involves deactivating the first clutch unit, wherein the output shaft of the internal combustion engine and the first input shaft are engaged, and disengaging each of the first set of gears connecting the first input shaft to the driving wheels. Simultaneously, the second clutch unit is deactivated, wherein the output shaft of the internal combustion engine and the second input shaft are disengaged, and one of the second set of gears connecting the second input shaft to the driving wheels is engaged.

According to a further embodiment, a dual clutch transmission in a vehicle is provided, which transmission comprises a first transmission mechanism arranged to transmit mechanical driving force from an output shaft of the prime mover to a first input shaft and to put each of a first set of gears in an engaged state to connect the first input shaft to the driving wheels. The transmission further comprises a second transmission mechanism arranged to transmit mechanical driving power from the output shaft of the prime mover to a second input shaft and to put one of a second set of gears in an engaged state to connect the second input shaft to the driving wheels. The definition of a "transmission mechanism" has been outlined above.

The first transmission mechanism comprises a controllable first clutch unit arranged to bring the output shaft of the prime mover and the first input shaft into engagement with each other. Similarly, the second transmission mechanism comprises a controllable second clutch unit arranged to bring the output shaft of the prime mover and the second input shaft into engagement with each other. An electronic control unit is arranged to control gear selection and clutch unit actuation. As indicated above, the control unit is arranged to monitor the dual clutch transmission and to control the transmission in response to input signals from the driver and detected prime mover and transmission parameters.

According to the invention, the electronic control unit is arranged to generate control signals in order to initiate a free-wheeling mode. In response to these control signals, the first clutch unit is arranged to be deactivated, wherein the output shaft of the prime mover and the first input shaft are engaged. In the first transmission mechanism, each of the first set of gears connecting the first input shaft to the driving wheels are arranged to be disengaged. This is achieved by actuating relevant shift actuators in response to control signals generated by the electronic control unit.

At the same time, the second clutch unit is arranged to be deactivated, wherein the output shaft of the prime mover and the second input shaft are disengaged. In the second transmission mechanism, one of the second set of gears connecting the second input shaft to the driving wheels is arranged to be engaged. During a free-wheeling mode the second input shaft and the open second clutch will be rotated by means of the engaged gear and the driving wheels.

As described above, the first clutch unit is normally closed which means that the clutch is held in a closed, engaged position by a resilient means, a spring or a similar suitable means. To disengage the first clutch it is actuated by hydraulic pressure or other suitable means. The second clutch unit is normally open which means that the clutch is held in an open, disengaged position by a resilient means, a spring or a similar suitable means. To engage the second clutch it is actuated by hydraulic pressure or other suitable means.

During a free-wheeling mode a transmission lubricating device is drivingly connected to the first transmission mechanism. As indicated above, this arrangement ensures sufficient lubrication of the transmission during free-wheeling, when no torque is transmitted between the prime mover and the driving wheels.

When the control unit monitoring the dual clutch transmission detects input signals from the driver and/or the prime mover and transmission indicating that the free-wheeling mode should be exited, then the transmission is controlled to reconnect the prime mover and the driving wheels. According to the invention, a rapid reconnection of the prime mover to the driven wheels is achieved by engaging the second, normally open clutch unit. Prior to engagement, the control unit can select a suitable gear depending on the input signals from the driver and/or the prime mover. As none of the first set of gears connecting the first input shaft to the driving wheels in the first transmission mechanism is engaged, the first clutch unit can be disengaged during or after engagement of the second clutch unit.

The present invention also relates to a computer program, computer program product and a storage medium for a computer all to be used with a computer for executing the method as described in any one of the above examples.

Further advantages and advantageous features of the invention are disclosed in the following description and in the dependent claims.

BRIEF DESCRIPTION OF THE DRAWINGS

In the following text, the invention will be described in detail with reference to the attached drawings. These schematic drawings are used for illustration only and do not in any way limit the scope of the invention. In the drawings.

DETAILED DESCRIPTION

Figure 1:
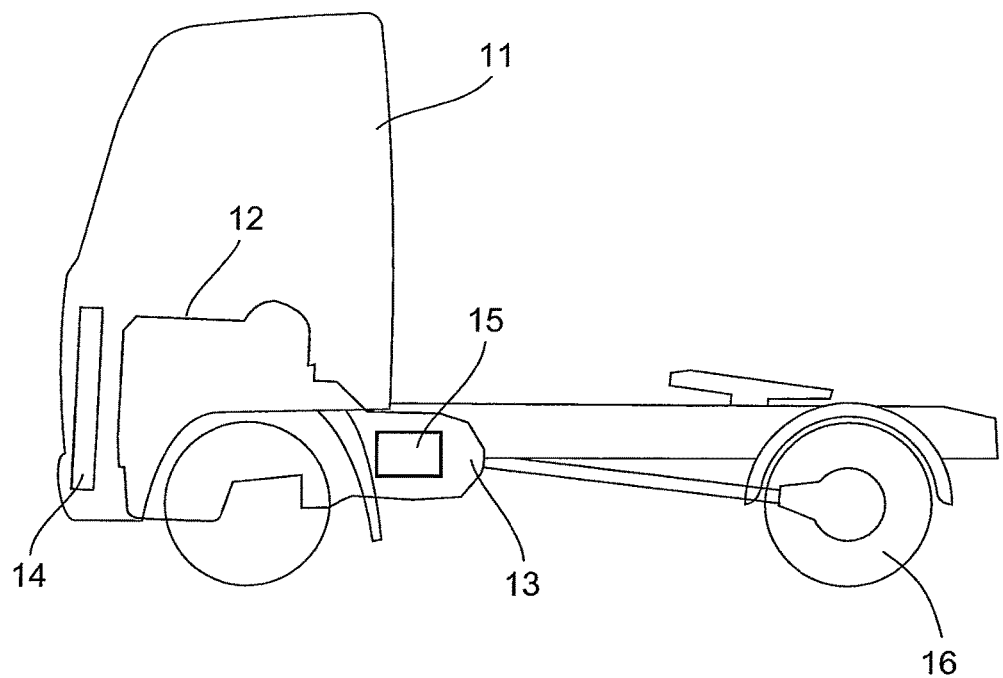
FIG. 1 shows a schematically indicated vehicle with a transmission arrangement for use with a method according to the invention.

FIG. 1 shows a schematically indicated vehicle 11 with a transmission arrangement for use with a method according to the invention. The vehicle 11 is provided with a prime mover, such as an internal combustion engine (ICE) 12 connected to a transmission 13, such as an automated manual transmission (AMT), for transmitting torque to a vehicle drive axle (not shown). The ICE 12 is connected to a radiator arrangement 14 for cooling engine coolant and oil from the ICE 12. The transmission 13 is controlled by the driver or automatically via an electronic control unit (ECU) 15. The ECU 15 is provided with control algorithms for controlling the transmission independently during, for instance, an engine start requested by the driver. The transmission is controlled to select a gear ratio between the engine 12 and a pair of driven wheels 16.

Figure 2:
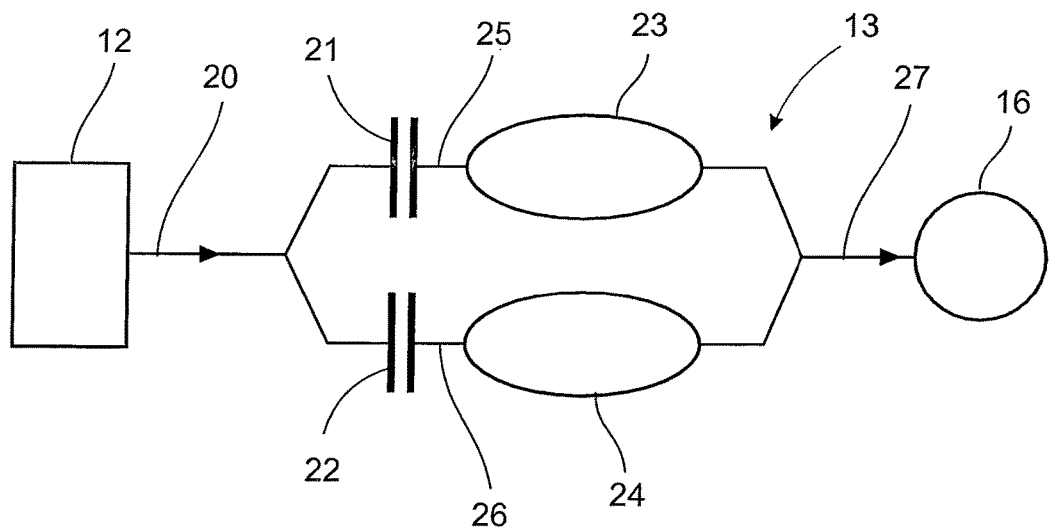
FIG. 2 shows a schematic diagram of a transmission arrangement suitable for use in a vehicle as indicated in FIG. 1.

FIG. 2 shows a schematic diagram of a transmission arrangement suitable for use in a vehicle as indicated in FIG. 1. The engine 12 has an output shaft 20 that is connected to the transmission 13. The transmission 13 comprises a dual clutch arrangement having a first and a second clutch unit 21, 22, respectively. The first clutch unit 21 is controlled by the electronic control unit 15 (FIG. 1) to connect the output shaft 20 to a first transmission mechanism, or gearbox unit 23, comprising a first input shaft 25, an output shaft and a number of gears (not shown) that can be actuated for controlling the gear ratio between the engine 12 and the driven wheels 16. A lubrication pump (not shown) is provided in the first transmission 23 and is drivingly connected to the first clutch unit 21. Similarly, the second clutch unit 22 can be controlled to connect the output shaft 20 to a second transmission mechanism, or gearbox unit 24, comprising a second input shaft 26, an output shaft and a number of gears (not shown) that can be actuated for controlling said gear ratio. The mechanical design of the first and second gearbox units 23, 24 is not part of the invention per se and will be described in general terms. Using the first and second clutch units 21, 22 in turn, the gears of the first and second gearbox units 23, 24 can be used for driving the wheels 16 via a drive shaft 27.

The electronic control unit 15 is connected to a number of existing sensors (not shown) for detecting and monitoring the lubrication of each clutch unit and the shafts and gears of the transmission. Examples of sensors are temperature sensors for measuring oil temperature and/or bearing temperature in one or more locations, oil level sensors for monitoring oil levels in one or more locations, as well as other suitable sensors for determining the lubricated state of the transmission. Data collected by the electronic control unit 15 is used as a basis for determining the lubricated state, and if the lubrication pump is not currently driven, for determine whether the first clutch unit should be operated to operate the pump.

Figure 3:
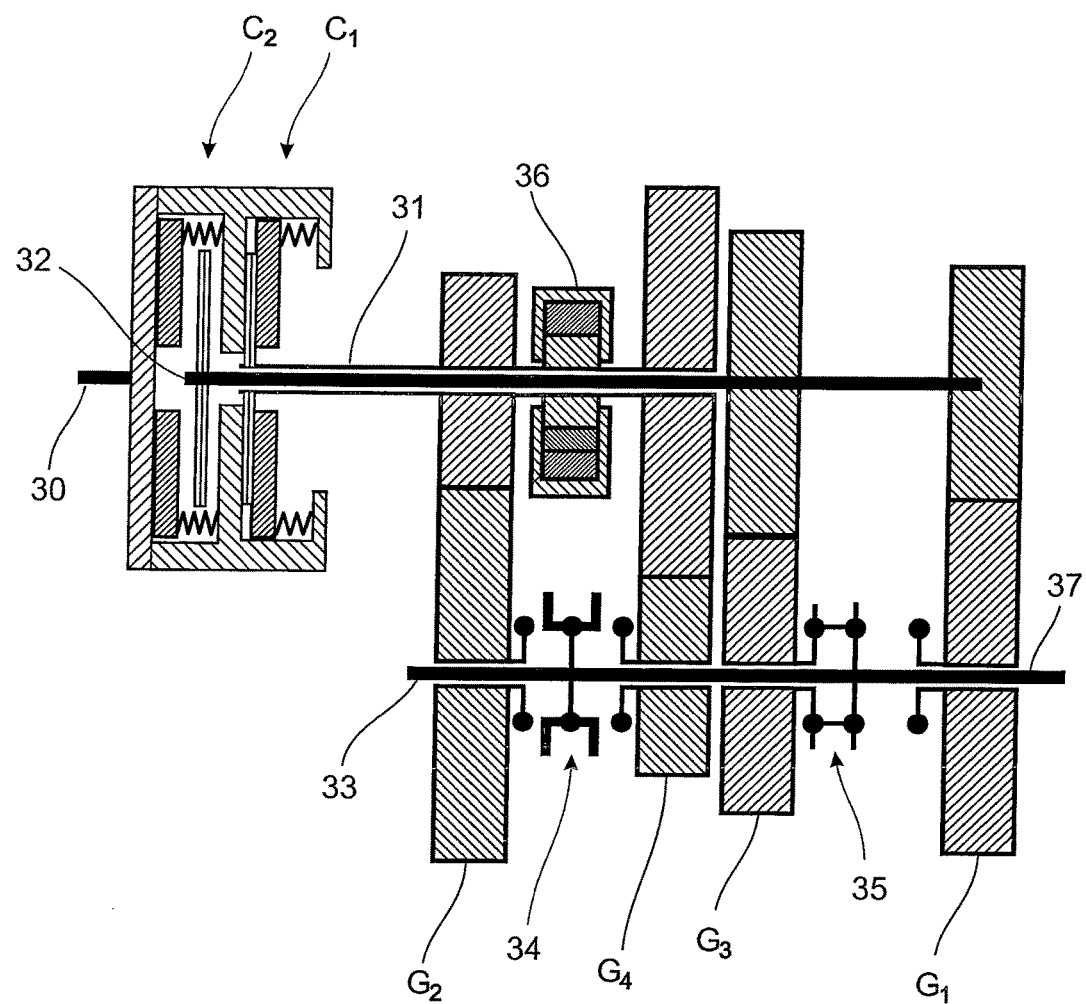
FIG. 3 shows a schematic cross-section of a transmission arrangement according to a first embodiment of the invention.

FIG. 3 shows a schematic cross-section of a transmission arrangement according to a first embodiment of the invention. In this embodiment, the transmission is described as being operated during free-wheeling.

The transmission arrangement is connected between the output shaft 30 of an engine (not shown; see FIG. 2) and a drive shaft 37, which drive shaft is connectable to at least one pair of driving wheels (not shown). In this example the transmission arrangement comprises a dual-clutch transmission connectable between the crankshaft and the drive shaft. The dual-clutch transmission comprises multiple rotatable components for transmitting torque from the engine to the driving wheels. The dual-clutch transmission has a first and a second input shaft 31, 32 of which the first input shaft 31 is a hollow shaft connected to a first clutch unit C1 and the second input shaft 32 is a solid shaft connected to a second clutch unit C2. The first clutch unit C1 is normally closed, wherein the clutch plate is spring loaded into its engaged position when the clutch unit C1 is deactivated. The second clutch unit C2 is normally open, wherein the clutch plate is spring loaded into its disengaged position when the clutch unit C2 is deactivated.

The first input shaft 31 is co-axially supported by tn-the second input shaft 32. The dual-clutch transmission further comprises at least a first countershaft 33 which is connectable to the clutch units C1, C2 by means of a number of manually and/or automatically selectable gears using actuators 34, 35. In this example, a first actuator 34 can be controlled to be displaced from a neutral position, as shown in FIG. 3, to connect a second gear G2 or a fourth gear G4 to the countershaft 33 to drive the drive shaft 37. A second actuator 35 can be controlled to be displaced from a neutral position to connect a first gear G1 or a third gear G3, as shown in FIG. 3, to the countershaft 33 to drive the drive shaft 37. A lubrication pump 36 is drivingly connected to the first clutch unit C1 and the first input shaft 31.

In this example, the transmission is shown during a free-wheeling condition. The freewheeling condition is initiated by deactivating the first clutch unit C1, wherein the output shaft 30 of the internal combustion engine and the first input shaft 31 are engaged. Simultaneously, each of a first set of gears G2, G4 that could connect the first input shaft 31 to the drive shaft 37 and the driving wheels are is-disengaged. Further, the second clutch unit C2 is deactivated, wherein the output shaft 30 of the internal combustion engine and the second input shaft 32 are disengaged. Simultaneously, one of the second set of gears G1, G3 connecting the second input shaft 32 to the drive shaft 37 and the driving wheels is engaged. In the example shown in FIG. 3, the second actuator 35 is actuated to engage the third gear set G3. As indicated above, lubrication of the transmission during freewheeling is ensured by the lubrication pump 36 connected to the output shaft 30 of the internal combustion engine via the first clutch unit C1 and the first input shaft 31.

During free-wheeling, an electronic control unit (see e.g. FIG. 1) arranged to monitor input signals from the driver and/or the engine and transmission indicating whether the freewheeling mode should be maintained or exited. At this time, the engaged first clutch unit C1, the first input shaft 31 and its associated gear sets G2, G4 are being rotated by the output shaft 30 of the internal combustion engine. At the same time, the disengaged second clutch unit C2, the second input shaft 32 and its associated gear sets G1, G3 are being rotated by driven wheels via the drive shaft 37. Hence, although no torque is transmitted between the internal combustion engine and the driving wheels, the gears and shafts of the transmission are maintained in rotation pending a subsequent reengagement to transmit torque between the engine and the driven wheels.

When the control monitoring the dual clutch transmission detects input signals from the driver and/or the engine and transmission indicating that the free-wheeling mode should be exited, then the transmission is controlled to reconnect the internal combustion engine and the driving wheels. According to the invention, a rapid reconnection of the engine to the driven wheels is achieved by engaging the second, normally open clutch unit C2. Prior to engagement, the control unit can select a suitable gear set G1, G3 depending on the input signals from the driver and/or the internal combustion engine. As none of the first set of gears G2, G4 connecting the first input shaft 31 to the drive shaft 37 are engaged, the first clutch unit C1 can be disengaged during or after engagement of the second clutch unit C2. This allows the transmission to be reengaged without delay as no acceleration of shafts or gears is required prior to actuation of the normally open second clutch unit C2.

Figure 4:
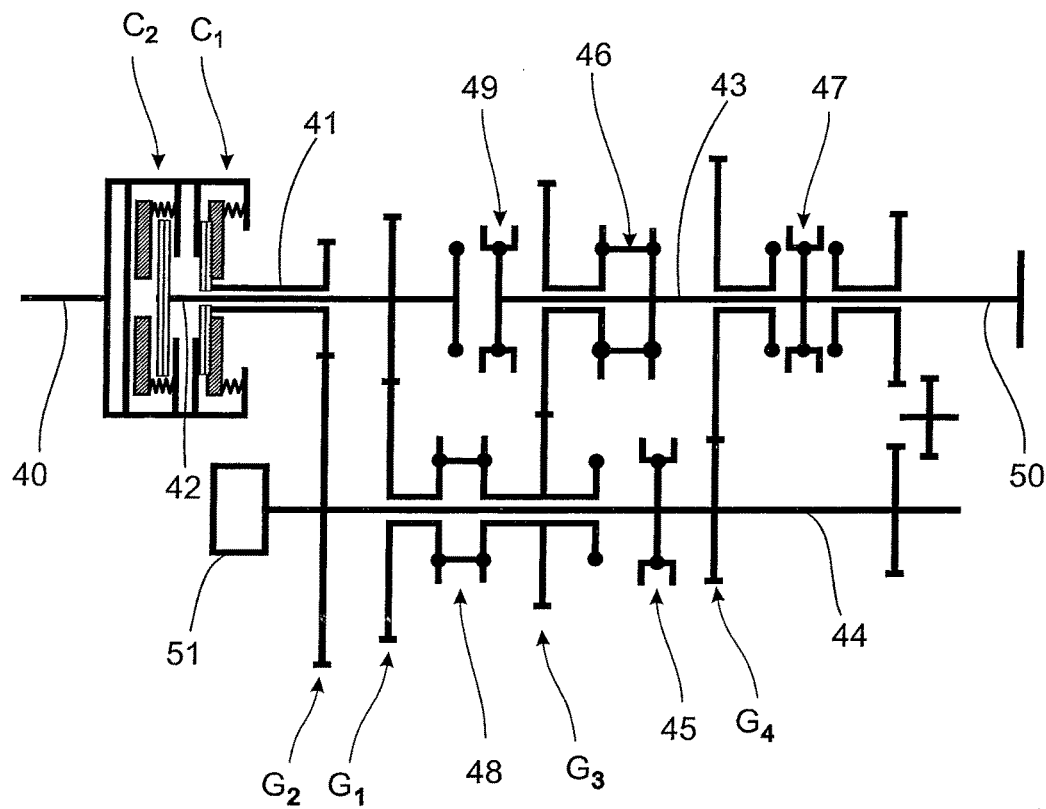
FIG. 4 shows a schematic cross-section of a transmission arrangement according to a second embodiment of the invention.

FIG. 4 shows a schematic cross-section of a transmission arrangement according to a second embodiment of the invention. In this embodiment, the transmission is described as being operated during free-wheeling.

The transmission arrangement is connected between the output shaft 40 of an engine (not shown; see FIG. 2) and a drive shaft 50, which drive shaft is connectable to at least one pair of driving wheels (not shown). In this example the transmission arrangement comprises a dual-clutch transmission connectable between the crankshaft and the drive shaft. The dual-clutch transmission comprises multiple rotatable components for transmitting torque from the engine to the driving wheels. The dual-clutch transmission has a first and a second input shaft 41, 42 of which the first input shaft 41 is a hollow shaft connected to a first clutch unit C1 and the second input shaft 42 is a solid shaft connected to a second clutch unit C2. The first clutch unit C1 is normally closed, wherein the clutch plate is spring loaded into its engaged position when the clutch unit C1 is deactivated. The second clutch unit C2 is normally open, wherein the clutch plate is spring loaded into its disengaged position when the clutch unit C2 is deactivated.

The first input shaft 41 is co-axially supported by the second input shaft 42. The dual clutch transmission further comprises a transmission output shaft 43 and at least a first countershaft 44. In this example, the first input shaft 41 is drivingly connected to the first countershaft 44 via a second gear set G2. The second input shaft 42 is drivingly connected to a first gear set G1. A third gear set G3 and a fourth gear set G4 can be drivingly connected to other rotating parts by a number of manually and/or automatically selectable actuators 45, 46, 47, 48. A further actuator 49 is provided for direct drive between the prime mover output shaft 40 and the drive shaft 50. A detailed description of the function of such an arrangement can be found in FIGS. 1-2 and the corresponding text in DE3131156A1. A transmission lubrication pump 51 on the first countershaft 44 is drivingly connected to the first clutch unit C1 and the first input shaft 41 via the second gear set G2.

In the example shown in FIG. 4, the transmission is placed in a free-wheeling condition. The free-wheeling condition is initiated by deactivating and closing the first clutch unit C1 wherein the output shaft 40 of the internal combustion engine and the first input shaft 41 are engaged. Simultaneously, the actuators 45, 46, 47, 48, 49 are in a combined state where the first countershaft 44 is not drivingly connected to the drive shaft 50. Further, the second clutch unit C2 is deactivated and opened, wherein the output shaft 40 of the internal combustion engine and the second input shaft 42 are disengaged. Simultaneously, the actuators 45, 46, 48, 49 are in a combined state where the second input shaft 42 is drivingly connected to the drive shaft 50.

In the example of FIG. 4, the second and the fourth actuators 46, 48 are actuated to connect the first and the third gear sets G1, G3 to the drive shaft 50. At the same time, the first and third actuators 45, 47 are deactivated to disconnect the second and the fourth gear sets G2, G4 from the drive shaft 50. The second and fourth gear sets G2, G4, will be rotated by the first clutch unit C1. As indicated above, lubrication of the transmission during freewheeling is ensured by the lubrication pump 51 connected to the output shah 30 of the internal combustion engine via the first clutch unit C1, the first input shaft 41 and the second gear G2.

During free-wheeling, an electronic control unit (see e.g. "15"; FIG. 1) arranged to monitor input signals from the driver and/or the engine and transmission indicating whether the freewheeling mode should be maintained or exited. At this time, the engaged first clutch unit C1, the first input shaft 41 and its associated gears are being rotated by the output shaft 40 of the internal combustion engine. At the same time, the disengaged second clutch unit C2, the second input shaft 42 and its associated gears are being rotated by driven wheels via the drive shaft 50. Hence, although no torque is transmitted between the internal combustion engine and the driving wheels, the gears and shafts of the transmission are maintained in rotation pending a subsequent reengagement to transmit torque between the engine and the driven wheels.

When the control unit monitoring the dual clutch transmission detects input signals from the driver and/or the engine and transmission indicating that the free-wheeling mode should be exited, then the transmission is controlled to reconnect the internal combustion engine and the driving wheels. According to the invention, a rapid reconnection of the engine to the driven wheels is achieved by activating and engaging the second, normally open clutch unit C2. Prior to engagement, the control unit can select a suitable gear set G1, G3 depending on the input signals from the driver and/or the internal combustion engine. Since the first input shaft 41 is not drivingly connected to the drive shaft 50, the first clutch unit C1 can be activated and disengaged during or after engagement of the second clutch unit C2. This allows the transmission to be reengaged without delay as no acceleration of shafts or gears is required, prior to actuation of the normally open second clutch C2.

Figure 5:
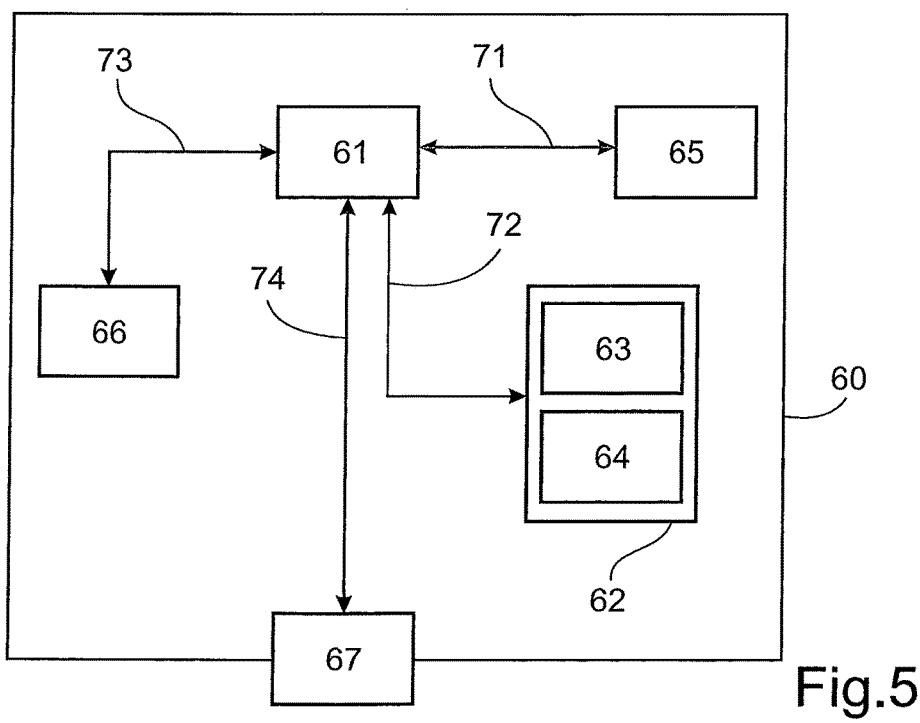
FIG. 5 shows the invention applied on a computer arrangement.

FIG. 5 shows an apparatus 60 according to one embodiment of the invention, comprising a non-volatile memory 62, a processor 61 and a read and write memory 66. The memory 62 has a first memory part 63, in which a computer program for controlling the apparatus 60 is stored. The computer program in the memory part 63 for controlling the apparatus 60 can be an operating system.

The apparatus 60 can be enclosed in, for example, a control unit, such as the control unit 15 in FIG. 1. The data-processing unit 61 can comprise, for example, a microcomputer.

The memory 62 also has a second memory part 64, in which a program for controlling the target gear selection function according to the invention is stored. In an alternative embodiment, the program for controlling the transmission is stored in a separate non-volatile storage medium 65 for data, such as, a CD or an exchangeable semiconductor memory. The program can be stored in an executable form or in a compressed state.

When it is stated below that the data-processing unit 61 runs a specific function, it should be clear that the data-processing unit 61 is running a specific part of the program stored in the memory 64 or a specific part of the program stored in the non-volatile storage medium 62.

The data-processing unit 61 is tailored for communication with the storage memory 62 through a first data bus 71. The data-processing unit 61 is also tailored for communication with the memory 62 through a second data bus 72. In addition, the data-processing unit 61 is tailored for communication with the memory 66 through a third data bus 73. The data-processing unit 61 is also tailored for communication with a data port 67 by the use of a fourth data bus 74.

The method according to the present invention can be executed by the data-processing unit 61, by the data-processing unit 61 running the program stored in the memory 64 or the program stored in the non-volatile storage medium 65.

The invention should not be deemed to be limited to the embodiments described above, but rather a number of further variants and modifications are conceivable within the scope of the following patent claims: For instance, the examples according to FIGS. 1 and 2 are directed to a commercial vehicle of the tractor-trailer type. However, the invention as outlined in the remaining figures can also be applied to trucks without trailers as well as articulated trucks.

The invention claimed is:

1. Method for controlling free-wheeling in a dual clutch transmission for a vehicle, the transmission comprising
   a first transmission mechanism arranged to transmit mechanical driving force from an output shaft of an internal combustion engine to a first input shaft and to put each of a first set of gears in an engaged state to connect the first input shaft to driving wheels;
   a second transmission mechanism arranged to transmit mechanical driving force from the output shaft of the internal combustion engine to a second input shaft and to put one of a second set of gears in an engaged state to connect the second input shaft to the driving wheels;

a controllable first clutch unit arranged to bring the output shaft of the internal combustion engine and the first input shaft into engagement with each other;

a controllable second clutch unit arranged to bring the output shaft of the internal combustion engine and the second input shaft into engagement with each other, and an electronic control unit arranged to control gear selection and clutch unit actuation, the method comprising determining that free-wheeling mode is to be initiated, and after determining that free-wheeling mode is to be initiated:

deactivating the first clutch unit, wherein the clutch is held in a closed, engaged position by a resilient means so that the output shaft of the internal combustion engine and the first input shaft are engaged;

disengaging each of the first set of gears that could connect the first input shaft to the driving wheels;

deactivating the second clutch unit, wherein the clutch is held in an open, disengaged position by a resilient means so that the output shaft of the internal combustion engine and the second input shaft are disengaged; and engaging one of the second set of gears connecting the second input shaft to the driving wheels, wherein the second input shaft and the open second clutch will be rotated by the driving wheels.

2. Method according to claim 1, comprising driving a lubricating device connected to the first transmission mechanism during free-wheeling.

3. Method according to claim 2, comprising deactivating the first and second clutch units during free-wheeling mode.

4. Method according to claim 1, comprising exiting free-wheeling mode by activating the second clutch unit, wherein the output shaft of the internal combustion engine and the second input shaft are engaged.

5. Dual clutch transmission in a vehicle, the transmission comprising a first transmission mechanism arranged to transmit mechanical driving force from an output shaft of an internal combustion engine to a first input shaft and to each of a first set of gears in an engaged state to connect the first input shaft to driving wheels;

a second transmission mechanism arranged to transmit mechanical driving force from the output shaft of the internal combustion engine to a second input shaft and to put one of a second set of gears in an engaged state to connect the second input shaft to the driving wheels;

a controllable first clutch unit arranged to bring the output shaft of the internal combustion engine and the first input shaft into engagement with each other;

a controllable second clutch unit arranged to bring the output shaft of the internal combustion engine and the second input shaft into engagement with each other, and an electronic control unit arranged to control gear selection and clutch unit actuation, wherein the electronic control unit is arranged to generate control signals in order to initiate free-wheeling mode and, in response to the control signals, the first clutch unit is arranged to be deactivated, wherein the clutch is arranged to be held in a closed, engaged position by resilient means so that the output shaft of the internal combustion engine and the first input shaft are engaged;

each of the first set of gears that could connect the first input shaft to the driving wheels are arranged to be disengaged, the second clutch unit is arranged to be deactivated, wherein the clutch is arranged to be held in an open, disengaged position by a resilient means so that the output shaft of the internal combustion engine and the second input shaft are disengaged; and one of the second set of gears connecting the second input shaft to the driving wheels is arranged to be engaged, wherein the second input shaft and the open second clutch are arranged to be rotated by the driving wheels.

6. Dual clutch transmission according to claim 5, wherein a lubricating device is drivingly connected to the first transmission mechanism during free-wheeling.

7. Dual clutch transmission according to claim 5, wherein the first and second clutch units are arranged to be deactivated during free-wheeling mode.

8. Dual clutch transmission according to claim 5, wherein the electronic control unit is arranged to generate control signals in order to terminate free-wheeling mode and that, in response to the control signals, the second clutch unit is arranged to be activated, wherein the output shaft of the internal combustion engine and the second input shaft are engaged.

9. Dual clutch transmission according to claim 5, wherein the resilient means comprises a spring, and the first clutch unit is displaced into its engaged, closed position by the spring when deactivated.

10. Dual clutch transmission according to claim 5, wherein the resilient means comprises a spring, and the second clutch unit is displaced into its disengaged, open position by the spring when deactivated.

11. A computer comprising a computer program for performing, when the program is run on the computer, a method for controlling free-wheeling in a dual clutch transmission for a vehicle, the transmission comprising a first transmission mechanism arranged to transmit mechanical driving force from an output shaft of an internal combustion engine to a first input shaft and to out each of a first set of gears in an engaged state to connect the first input shaft to driving wheels;

a second transmission mechanism arranged to transmit mechanical driving force from the output shaft of the internal combustion engine to a second input shaft and to put one of a second set of gears in an engaged state to connect the second input shaft to the driving wheels;

a controllable first clutch unit arranged to bring the output shaft of the internal combustion engine and the first input shaft into engagement with each other;

a controllable second clutch unit arranged to bring the output shaft of the internal combustion engine and the second input shaft into engagement with each other, and an electronic control unit arranged to control gear selection and clutch unit actuation, the method comprising determining that free-wheeling mode is to be initiated, and after determining that free-wheeling mode is to be initiated:

deactivating the first clutch unit wherein the clutch is held in a closed, engaged position by a resilient means so that the output shaft of the internal combustion engine and the first input shaft are engaged;
disengaging each of the first set of pears that could connect the first input shaft to the driving wheels;
deactivating the second clutch unit, wherein the clutch is held in an open, disengaged position by a resilient means so that the output shaft of the internal combustion engine and the second input shaft are disengaged; and
engaging one of the second set of gears connecting the second input shaft to the driving wheels, wherein the second input shaft and the open second clutch will be rotated by the driving wheels.

12. A non-transitory computer program product comprising a computer program stored on a non-transitory computer readable medium for performing, when the program product is run on a computer, a method for controlling free-wheeling in a dual clutch transmission for a vehicle, the transmission comprising
a first transmission mechanism arranged to transmit mechanical driving force from an output shaft of an internal combustion engine to a first input shaft and to put each of a first set of gears in an engaged state to connect the first input shaft to driving wheels;
a second transmission mechanism arranged to transmit mechanical driving force from the output shaft of the internal combustion engine to a second input shaft and to put one of a second set of gears in an engaged state to connect the second input shaft to the driving wheels;
a controllable first clutch unit arranged to bring the output shaft of the internal combustion engine and the first input shaft into engagement with each other;
a controllable second clutch unit arranged to bring the output shaft of the internal combustion engine and the second input shaft into engagement with each other, and
an electronic control unit arranged to control gear selection and clutch unit actuation,
the method comprising
determining that free-wheeling mode is to be initiated, and
after determining that free-wheeling mode is to be initiated:
deactivating the first clutch unit, wherein the clutch is held in a closed, engaged position by a resilient means so that the output shaft of the internal combustion engine and the first input shaft are engaged;
disengaging each of the first set of gears that could connect the first input shaft to the driving wheels;
deactivating the second clutch unit, wherein the clutch is held in an open, disengaged position by a resilient means so that the output shaft of the internal combustion engine and the second input shaft are disengaged; and
engaging one of the second set of gears connecting the second input shaft to the driving wheels, wherein the second input shaft and the open second clutch will be rotated by the driving wheels.

13. A non-transitory storage medium for use in a computing environment, the medium comprising a computer readable program to perform a method for controlling free-wheeling in a dual clutch transmission for a vehicle, the transmission comprising
a first transmission mechanism arranged to transmit mechanical driving force from an output shaft of an internal combustion engine to a first input shaft and to put each of a first set of gears in an engaged state to connect the first input shaft to driving wheels;
a second transmission mechanism arranged to transmit mechanical driving force from the output shaft of the internal combustion engine to a second input shaft and to put one of a second set of gears in an engaged state to connect the second input shaft to the driving wheels;
a controllable first clutch unit arranged to bring the output shaft of the internal combustion engine and the first input shaft into engagement with each other;
a controllable second clutch unit arranged to bring the output shaft of the internal combustion engine and the second input shaft into engagement with each other, and
an electronic control unit arranged to control gear selection and clutch unit actuation,
the method comprising
determining that free-wheeling mode is to be initiated, and
after determining that free-wheeling mode is to be initiated:
deactivating the first clutch unit, wherein the clutch is held in a closed, engaged position by a resilient means so that the output shaft of the internal combustion engine and the first input shaft are engaged;
disengaging each of the first set of gears that could connect the first input shaft to the driving wheels;
deactivating the second clutch unit wherein the clutch is held in an open, disengaged position by a resilient means so that the output shaft of the internal combustion engine and the second input shaft are disengaged; and
engaging one of the second set of gears connecting the second input shaft to the driving wheels, wherein the second input shaft and the open second clutch will be rotated by the driving wheels.

* * * * *